Feb. 26, 1924.
K. A. ZANDER
1,484,923
PORTABLE TOOL DEVICE
Filed June 27, 1922
2 Sheets-Sheet 1
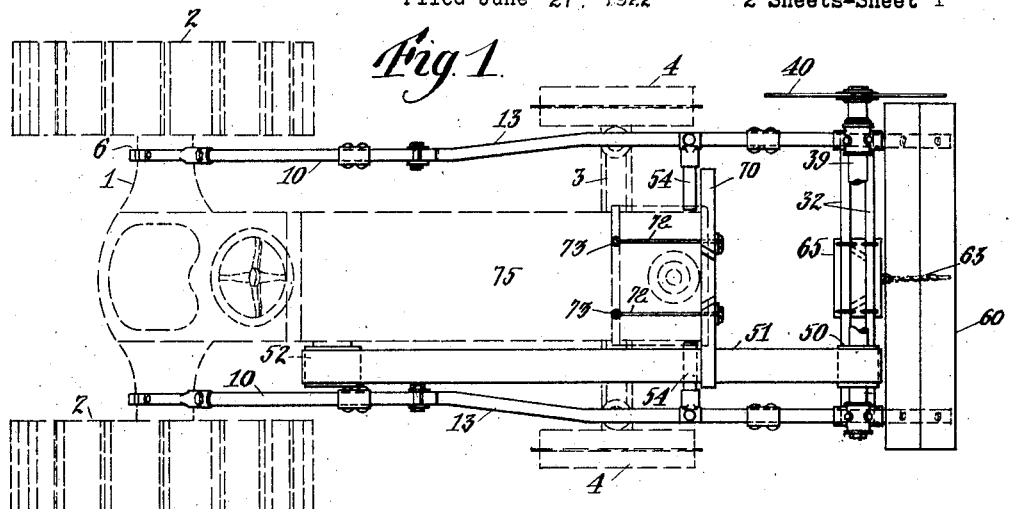
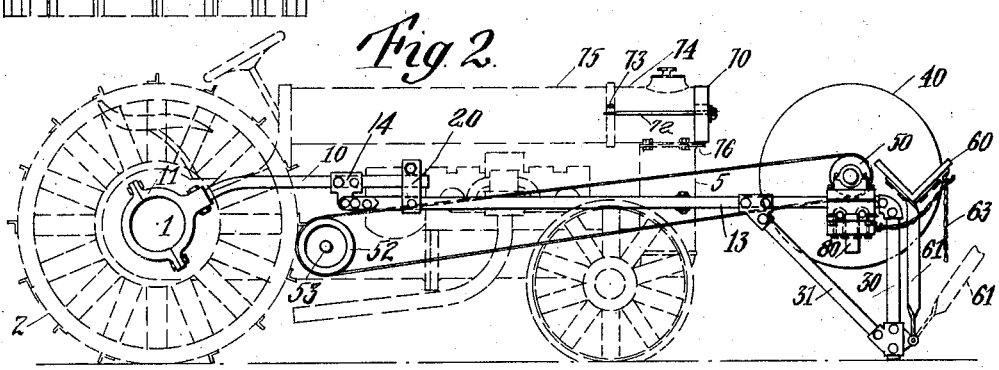
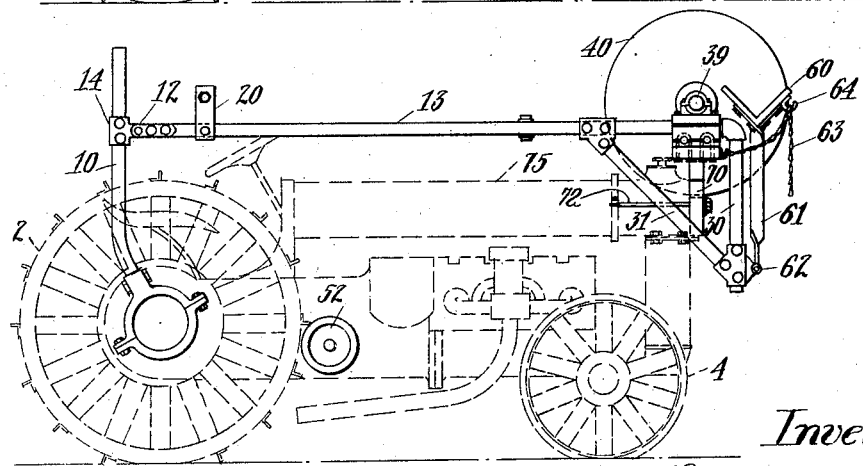
Inventor
Karl A. Zander
by Wright, Brown, Quinby & May
Attys Feb. 26, 1924.

K. A. ZANDER 1,484,923

PORTABLE TOOL DEVICE

Filed June 27, 1922   2 Sheets-Sheet 2

Inventor
Karl A. Zander
by Wright, Brown, Quinby & May
attys

Patented Feb. 26, 1924.

1,484,923

UNITED STATES PATENT OFFICE.

KARL A. ZANDER, OF STOW, MASSACHUSETTS.

PORTABLE TOOL DEVICE.

Application filed June 27, 1922. Serial No. 571,271.

*To all whom it may concern:*

Be it known that I, KARL A. ZANDER, a citizen of the United States, residing at Stow, in the county of Middlesex and State of Massachusetts, have invented new and useful Improvements in Portable Tool Devices, of which the following is a specification.

This invention relates to a portable tool device adapted to be carried by a tractor from place to place, and to be driven to do its appointed work by power from the tractor when in stationary operating position; this device having been designed particularly for use with circular saws and including means for presenting thereto wood to be cut, though other types of tool may be employed as occasion requires.

It provides a construction which is readily carried by the vehicle and which may be quickly and easily placed in a stationary position so related to the vehicle as to be in proper relation to be driven therefrom.

Referring to the accompanying drawings which illustrate one embodiment of the invention, Figure 1 is a top plan of the device when in operative position, the tractor being shown in dotted lines.

Figure 2 is a side elevation of the same.

Figure 3 is a side elevation showing the device in inoperative position for transportation on the tractor.

Figure 5:
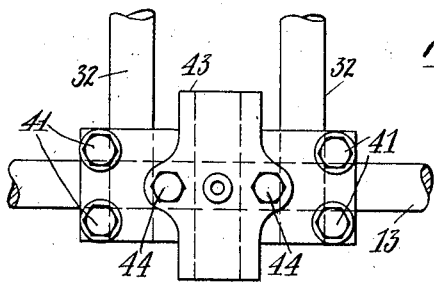
Figures 5 and 6 are plan and side elevations, respectively, of a shaft bearing and connecting members.

Referring to Figures 1, 2, and 3 the broken line structure indicates a tractor having a housing 1 in which is contained the driving axle on the ends of which are mounted the traction wheels 2 and a forward axle 3 carrying at its ends on stub axles of any suitable construction steering wheels 4. The forward end of the tractor is shown as provided with a radiator 5 with which certain portions of the device to be described cooperate as will later appear.

Figure 7:
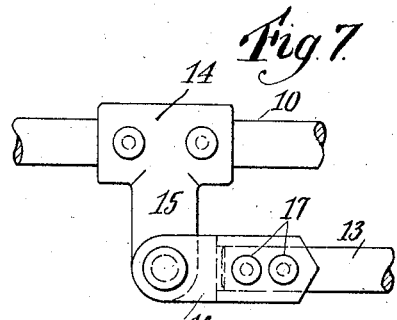
Figure 7 is a fragmentary side elevation of a pivotal connection.

In tractors of this type it is common to provide the rear driving axle housing, closely adjacent the driving wheels, with a pair of bearing surfaces, each flanked by two ribs to support a brake attachment for use when it is desirable to equip the tractor with brakes. When used as a tractor these bearings are not in use and provide a convenient mounting for the rear end of the device of this invention. For this purpose a pair of rods or arms 10 have fixed at their rear ends separable collars 11 arranged to engage about the said bearing surfaces whereby the rods 10 are pivoted at their rear ends to the axle housing, so that they may extend forwardly in a substantially horizontal plane along opposite sides of the tractor as shown in Figures 1 and 2, or may be raised about the axle housing as a pivot as shown in Figure 3. Adjacent their free ends these rods, which may, if desired, be formed of sections of pipe, have pivoted thereto at 12 the rear end of side frame members 13, which may also be formed of pipes. The pivotal connection 12 is preferably provided by means of a collar 14 through which the pipe 10 passes, as shown more particularly in Figure 7, and having a laterally extending lug 15 to which may be pivoted a member 16 having a recessed end to receive and have fixed therein by means such as rivets 17, the rear end of a frame member 13.

Figures 8, 9:
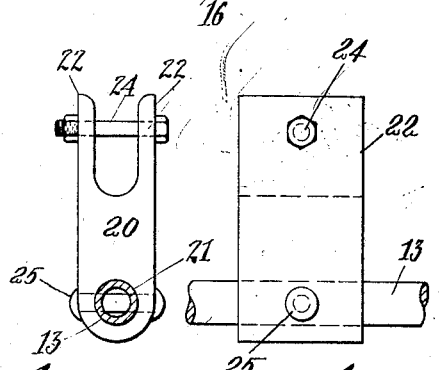
Figures 8 and 9 are end and side elevations, respectively, of a supporting bracket.

Forwardly of the pivot 12 each member 13 has preferably fixed thereon a locking block 20 which is shown in detail in Figures 8 and 9. This locking block consists of a casting having a perforation therethrough adjacent one end at 21 to receive the member 13 which is preferably riveted therein by means of a rivet 25. The opposite end of this casting is notched to form a pair of parallel spaced side pieces 22 between which the free end of the rod 10 may project when this rod is brought down in its substantially horizontal position as shown at Figure 2 and in dotted lines in Figure 8. In this position a locking pin or bolt 24 may be passed through alined perforations near the ends of the side members 22 to hold the rod 10 in position therebetween.

Figure 6:
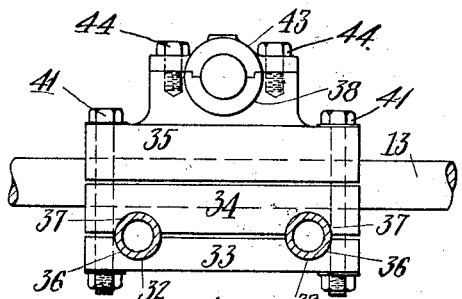

The forward ends of the frame members 13 are shown as provided with downward extensions 30 forming supporting legs therefor by which the forward ends of these members may be supported from the ground. If desired a brace 31 may be placed between the lower end of each leg 30 and its frame member 13. These frame members extend over the front axle so that the legs 30 engage the ground forwardly of the vehicle. Adjacent the forward ends of the frame members 13 are transverse tie members 32. These members may also be formed of pipe and may be attached to the side members 13 by means shown more in detail in Figures 5 and 6. Referring to these Figures three superposed blocks are shown at 33, 34, and 35. The upper face of the block 33 is formed with grooves or recesses 36 therein to receive the lower portions of the transverse members 32. The lower face of the block 34 is formed with corresponding grooves or recesses 37 to receive the upper portions of the members 32, while the upper face of the block 34 is formed at right angles to the recesses 37 with a recess to receive the lower half of the frame member 13. The upper block 35 is formed with a complemental recess to receive the upper portion of the member 13. The block 35 also is provided with the lower half of a bearing 38 for a tool shaft 39 indicated on Figures 1, 2, and 3 for carrying the tool such as a circular saw shown at 40. The blocks 33, 34, and 35 are bolted together to hold the frame members and the shaft in assembled position by means of bolts such as 41.

Enclosing the upper portion of the tool shaft 39 is a cap plate 43 which is bolted in position by cap bolts 44. The shaft 39, adjacent one of the frame members 13, has fixed thereto a belt pulley 50 in position to be connected by a belt 51 to a power pulley 52 carried by the power shaft 53 of the tractor, the belt being of sufficient length to engage these pulleys when the rods 10 are in horizontal position and the legs 30 engage the ground forwardly of the tractor. In order to prevent lateral motion of the frame members 13 relative to the tractor which might cause the belt to run off the pulleys, brace members may be provided, such members being shown at 54, comprising pipe sections coupled to and extending inwardly in opposed relation from the opposite frame members 13, their inner ends abutting against the side faces of the tractor radiator 5.

It will be noted that the driving pulley 52 is below, and the driven pulley 50 is above, the line of the rods 10 and frame 13 when the frame is extended in working position, and that the pull of the belt is exerted on a downward inclination from the tool shaft and in a line, the resultant of which passes beneath the pivot connection 12 and also beneath the axis on which the rods are pivoted, that is, the axis of the axle housing 1. Hence the pull of the belt tends to hold the frame in the extended position and to hold the legs at the outer end of the machine firmly against the ground. In other words, there is no tendency of the belt either to raise the forward end of the machine or to collapse or buckle the folding frame.

In order to present the work to the saw a work table or trough is shown at 60, this table being supported at the upper ends of a pair of arms 61 pivoted at their lower ends on a rod or shaft 62 fixed adjacent the lower ends of the legs 30. By this construction the work table may be swung in a direction to present work to the saw. In order to prevent the work trough from swinging too far downwardly away from the saw, a stop chain as indicated at 63 may be employed, one end of the chain being made fast to the frame and the other end being engaged over a hook 64 on the work table. As shown in Figure 1 the inner end of this chain is fixed to a support 65 made fast to the cross frame members 32.

Figure 4:
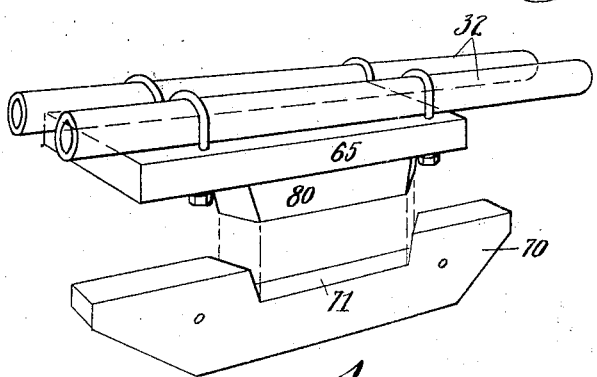
Figure 4 is a disassembled view of mating members fixed to the device and tractor, respectively, by which the device may be retained in inoperative position for transportation.

When the rods 10 are in their upward position, as shown in Figure 3, it is intended that the device should be supported entirely by the tractor, the forward end of the device being raised and pushed rearwardly to raise the rods 10 into vertical position. For this purpose interengaging members are formed on the frame and tractor by which the forward end of the frame may be supported from the tractor. These members are shown more in detail in Figure 4 in which 70 indicates a block having a notch 71 in its upper face the sides of which notch diverge upwardly and rearwardly. This block may be supported in any suitable manner at the forward end of the tractor, being shown on Figures 1, 2, and 3, as made fast by means of a pair of eyebolts 72 passed therethrough, the eyes of these bolts engaging vertical bolts 73 which are employed to attach certain portions of the tractor together, such portions in the present embodiment consisting of a tie plate 74 and a fuel tank 75, the tie plate being made fast to the radiator 5 at its forward end. The lower edge of the block 70 may rest on the usual flange 76 at the top of the radiator by which flange this radiator is fixed in position to the cover plate 74.

Cooperating with the block 70 is a block 80 shaped to fit within the notch 71, this block being made fast to the lower face of the support 65 above mentioned. When the frame is in its forward ground-engaging position, its forward end may be raised upwardly and the frame moved bodily rearwardly swinging the rods 10 upwardly and bringing the forward end of the frame into position where the block 80 may be engaged within the notch 71. The tapered formation of the block and notch prevents the block from slipping out of the notch in a forward direction, it being necessary to raise the frame before it can be moved forwardly so as to again assume its ground-engaging position in which it is operative to perform work by power derived from the tractor power shaft. The frame is locked in its operating position by means of the locking pins 24 engaging the forward ends of the members 10 and is locked in its upward position by engagement of the block 80 within the notch 71.

Having thus described an embodiment of this invention it should be evident that various changes and modifications might be made therein without departing from its spirit or scope as defined by the appended claims.

I claim:

1. An attachment for a vehicle comprising, in combination, a pair of arms pivoted at one end to a part of the vehicle, a frame pivoted at one end to said arms and having ground-engaging members at its opposite end, a transverse shaft at said opposite end, a tool on said shaft, and means for supporting said opposite end from said vehicle with said ground-engaging members out of ground-engaging position.

2. An attachment for a vehicle having a driving axle, housing and an axle spaced apart from said housing which comprises, in combination, a pair of arms pivoted at one end to said housings, a frame extending over said axle and pivoted at one end to said arms and having ground-engaging members at the other end, and a support on said vehicle to receive said other end of said frame on raising said frame and shifting it toward said axle to cause said arms to swing on their pivots.

3. An attachment for a vehicle having an axle, a driving axle housing provided with bearing portions, a power shaft, a pulley on said shaft, which comprises, in combination, rods each having one end embracing one of said bearing portions, a frame pivoted to said rods at its rear end to be raised and lowered by swinging of said rods about said housing, and having members constructed to engage the ground forwardly of said axle, a shaft carried by said frame, a pulley on said shaft for belt connection to said driving pulley, a tool on said frame shaft, and means to support the forward end of said frame from the vehicle with said members raised from the ground when the rear end of said frame is raised by the swinging of said rods upwardly about said housing.

4. In combination with a vehicle having an axle, a driving axle housing provided with bearing portions, a power shaft, a pulley on said shaft, an attachment comprising rods, each having one end embracing each one of said bearing portions, a frame pivoted to said rods at its rear end to be raised and lowered by swinging of said rods about said housing, and having members constructed to engage the ground forwardly of said axle, a shaft carried by said frame, a pulley on said shaft for belt connection to said driving shaft pulley, a tool on said frame shaft, means for presenting work to said tool carried by said frame, and means to support the forward end of said frame from the vehicle with said members raised from the ground when the rear end of said frame is raised by the swinging of said rods upwardly about said brake drums.

5. An attachment for a vehicle having a pair of axles, which comprises a pair of arms pivoted to one of said axles and movable between substantially upright and substantially horizontal positions, a frame having one end pivoted to said arms and extending over said other axle and having members at its opposite end engaging the ground when said arms are in substantially horizontal position, means for locking said arms and frame in the last named position, and elements on said vehicle and frame interfitting when the opposite end of said frame is raised and the frame is moved toward said one axle to swing said arms upwardly and raise the corresponding end of said frame, whereby said frame is supported entirely by said vehicle and is so held.

6. An attachment for a vehicle having a pair of axles, which comprises a pair of arms pivoted to one of said axles and movable between substantially upright and substantially horizontal positions, a frame having one end pivoted to said arms and extending over said other axle and having members at its opposite end engaging the ground when said arms are in substantially horizontal position, and elements on said vehicle and frame interfitting when the opposite end of said frame is raised and the frame moved toward said one axle to swing said arms upwardly and raise the corresponding end of said frame, whereby said frame is supported entirely by said vehicle and is so held.

7. An attachment for a vehicle having a pair of axles, which comprises a pair of arms pivoted to one of said axles and movable between substantially upright and substantially horizontal positions, a frame having one end pivoted to said arms extending over said other axle, and having members at its opposite end engaging the ground when said arms are in substantially horizontal position, and elements on said vehicle and frame interfitting when the opposite end of said frame is raised and the frame moved toward said one axle to swing said arms upwardly and raise the corresponding end of said frame, whereby said frame is supported entirely by said vehicle and is so held, and means for preventing relative lateral movement of said vehicle and frame when said frame is in lowered position.

8. An attachment for a tractor having a power shaft and a pulley thereon which comprises, in combination, a frame movable between a position partly supported by the ground and a position entirely supported by said tractor, a tool shaft carried by said frame, a pulley on said tool shaft, and braces on said frame arranged to abut on portions of the tractor for maintaining said pulleys alined for belted connection when said frame is in ground-supported position.

9. An attachment for a tractor having a power shaft and a pulley thereon which comprises, in combination, a frame movable between a position partly supported by the ground and a position entirely supported by said tractor, a tool shaft carried by said frame, a pulley on said tool shaft, and arms extending from said frame and engaging on opposite sides of said tractor when said frame is in ground-supported position to hold said pulleys in alinement for belt connection.

10. An attachment for a tractor having a pair of axles, a radiator at one end, a power shaft, and a pulley on said power shaft, which comprises, in combination, a frame supported at one end at one of said axles and extending over the other axle and having members for supporting it from the ground at its opposite end, a tool shaft carried by said frame, a pulley on said tool shaft belt connected to said power shaft pulley, and members carried by said frame and engaging on opposite sides of said radiator to hold said pulleys in alinement.

11. In a device of the class described, a frame comprising longitudinal and cross members, and a power shaft, and means for holding said members and shaft in assembled relation comprising an intermediate block having recesses to receive portions of said longitudinal and cross members, mating blocks being recessed to receive certain of said members, one of said blocks having bearings for said shaft, and means for holding said blocks in superposed relation.

12. In a device of the class described, a frame comprising longitudinal and cross members, a power shaft, and means for holding said members and shaft in assembled relation comprising sets of three superposed blocks, the intermediate block of each set being recessed on opposite sides to receive and partially house said longitudinal and cross members, respectively, one of the end blocks of each set being recessed to form a mating housing for a longitudinal member, and the other of said end blocks being recessed to form a mating housing for said cross member, one of said end blocks also having a bearing for said shaft.

13. In combination with an automotive vehicle, a machine attachment comprising a frame pivoted at one end to a part of the vehicle and adapted to rest on the ground at its opposite end, said frame being jointed between its ends whereby the pivoted portion may swing and the extremity may be raised and moved bodily from a position in which it rests on the ground clear of the vehicle, to a position in which it is supported by the vehicle.

14. In combination with an automotive vehicle, a machine attachment comprising a frame pivoted at one end to a part of the vehicle and adapted to rest on the ground at its opposite end, said frame being jointed between its ends whereby the pivoted portion may swing and the extremity may be raised and moved bodily from a position in which it rests on the ground clear of the vehicle, to a position in which it is supported by the vehicle, the supporting portion of the vehicle and that part of the machine attachment which is supported thereby having interlocking elements, and one of said elements having a notch, the sides of which diverge upwardly and also toward an adjacent part of the vehicle.

15. In combination with an automotive vehicle, a machine attachment adapted to be driven by said vehicle and having a folding frame, part of which is permanently pivoted to the vehicle and another part of which is adapted to rest either on the ground or on the vehicle, a block mounted on the end of the vehicle adjacent to the last-named part of said machine attachment, said block having a notch in its upper edge which flares upwardly, and the sides of which also diverge from front to rear, and a complemental block on said last-named part of the attachment formed to fit said notch.

16. In combination with an automotive vehicle, a machine attachment comprising a frame pivoted at one end to a part of the vehicle and adapted to rest on the ground at its opposite end, said frame being jointed between its ends whereby the pivoted portion may swing and the extremity may be raised and moved bodily from a position in which it rests on the ground clear of the vehicle, to a position in which it is supported by the vehicle, a power shaft and pulley on the vehicle, a driven pulley on the machine attachment, and a belt passing over said pulleys, the pulleys being so arranged that the pull of the belt tends to hold the outer end of the attachment on the ground and to hold the jointed members of the frame in extended position.

17. In combination, an automotive vehicle including a protruding power shaft and a pulley on said shaft, a machine attachment for said vehicle comprising a frame pivoted to the vehicle at one end and adapted to rest on the ground at the other end, a tool shaft on said frame and a pulley on said tool shaft adapted to be belt-driven from the first-named pulley, said frame being jointed between its ends, whereby the ground-supported end may be raised and be moved rearward into a supporting position on the vehicle, said driving pulley being at a lower level than said driven pulley and in a line from the latter which extends beneath the joint of said frame and also beneath the pivoted axis of the frame, whereby the pull of the driving belt tends to hold the frame in extended position and to hold the outer end of said frame firmly on the ground.

18. In combination with an automotive vehicle, a machine attachment comprising rods pivoted to the vehicle, a frame having members pivoted at one end to said rods and adapted at the other end to rest on the ground or to be moved into a position of support on the vehicle, said rods having extensions beyond the points of their attachment to the frame members and lying beside said members when the frame is in one of its positions, and locking means arranged to hold said extensions and members in a substantially unchanging relation.

19. In combination with an automotive vehicle, a machine attachment comprising rods pivoted to the vehicle, a frame having members pivoted at one end to said rods and adapted at the other end to rest on the ground or to be moved into a position of support on the vehicle, said rods having extensions beyond the points of their attachment to the frame members and lying beside said members when the frame is in one of its positions, and a locking member carried by one of said frame members and having separated side pieces adapted to embrace the extension of the adjacent rod when the frame is in one of its aforesaid positions, and a removable locking pin contained in said side pieces and arranged to cross the space between them outside of said extension.

In testimony whereof I have affixed my signature.

KARL A. ZANDER.